L. YOUNG.
Rotary Measure.
No. 13,833. Patented Nov. 20, 1855.
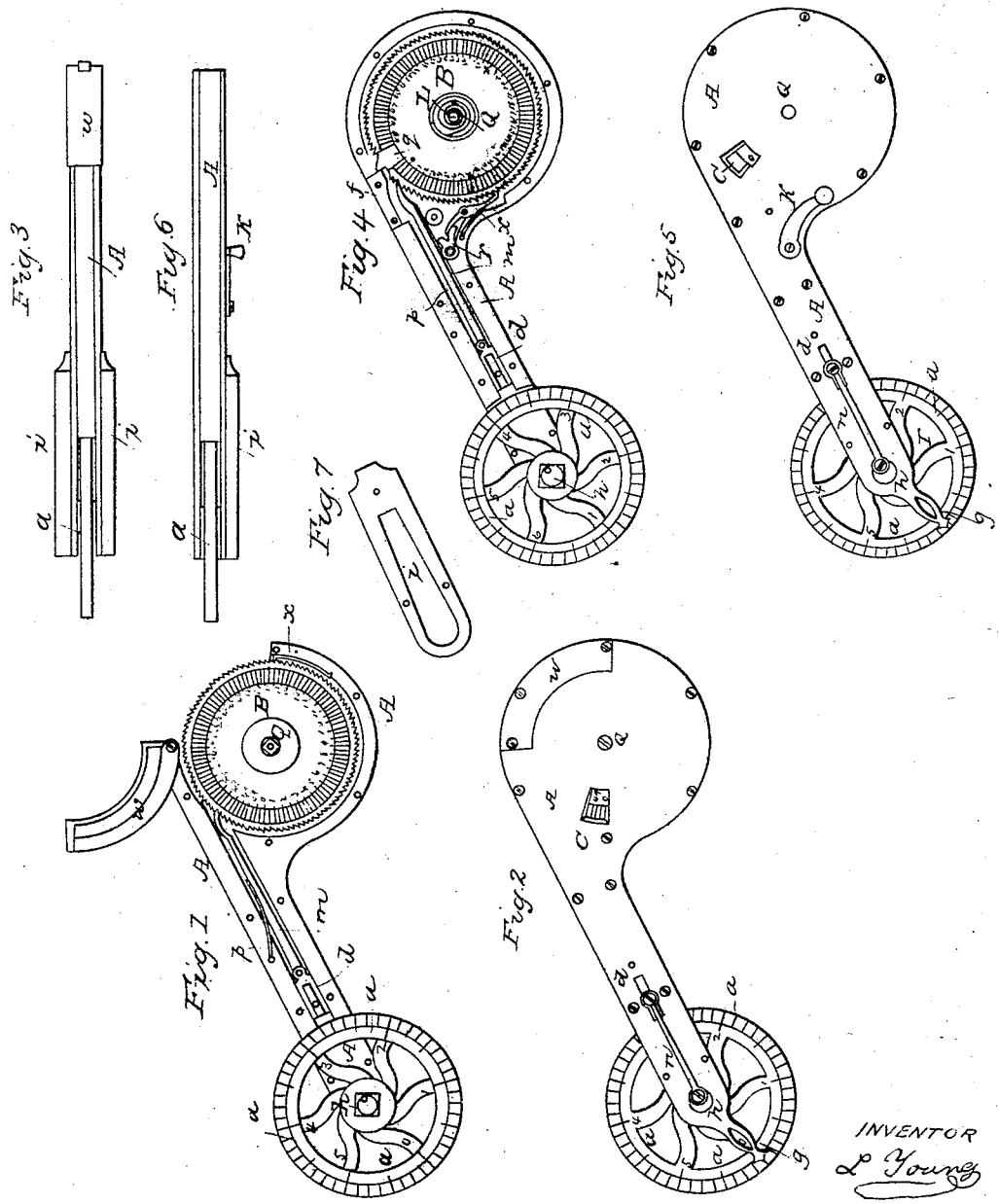
INVENTOR
L. Young

UNITED STATES PATENT OFFICE.

LOUIS YOUNG, OF NEW YORK, N. Y.

REVOLVING MEASURING-WHEEL.

Specification of Letters Patent No. 13,833, dated November 20, 1855.

*To all whom it may concern:*

Be it known that I, LOUIS YOUNG, of New York, in the county and State of New York, have invented a new and useful Revolving Measure; and I do hereby declare that the following is a full, clear, and exact description of the construction and operation of the same, reference being had to the annexed drawings, making a part of this specification, and to the letters of reference marked thereon.

Figure I is a longitudinal section of the measure. Fig. II, is an outside view of the same with the cap (*i*) removed. Fig. III, is a top view of the same. Figs. IV, V, and VI, are inside, outside, and top views of a revolving measure, with some modifications and Fig. VII is a view of the cap (*i*).

(*a*) is a wheel six inches on its circumference and divided in inches and parts of inches on its face, attached to an axis (*h*), turning freely in the casing (A). On one or both ends of the axis (*h*) a small eccentric is attached and connected through the rod or rods (*n*) with the slide (*d*), sliding in suitable grooves in the casing (A). To this slide (*d*) a lever (*m*) is fastened which works into teeth on the circumference of a wheel (B). By this arrangement every revolution of the wheel (*a*), the wheel (B) is turned the distance of one tooth around.

(*p*) is a small spring acting upon the lever (*m*) to insure always, even by a quick motion, the falling in of said lever (*m*) into every tooth of the wheel (B).

(*x*) is a spring catch, to hold the wheel (B) and prevent any possibility of the same turning back while the lever (*m*) moves from one tooth to the next following.

(*w*) (Figs. I, II and III) is a cover made in the casing (A) to be able to get at the wheel (B) to turn the same by hand when required. The wheel (B) has on its face divisions corresponding with the teeth on its circumference, which said divisions are numbered and can be seen through an opening (C) in the side of the casing (A). The circumference of the wheel (*a*), if as before mentioned, is made six inches, will by each revolution turn the wheel (B) one tooth around, consequently each of the divisions on the face of the wheel (B) will show six inches, and the number of feet and inches which can be measured by any instrument depends therefore upon the size of the wheel (B). If any very great length is required to be measured a small wheel can be placed on one side of the axis (Q) of the wheel (B) working into a larger index wheel by which the number of feet capable of being measured at one time can be extended to several hundred feet, without the possibility of any mistakes occurring. To use this revolving measure turn the wheel (*a*) so that the pointer (*g*) attached to the casing (A) corresponds with the division marked (*o*) on said wheel, then open the cover (*w*) and turn the wheel (B) that the division marked (*o*) thereon, corresponds with the lower edge of the opening (C) in the side of the casing (A) as represented in the drawings. Then place the instrument upon the substance to be measured, so that the division (*o*) of the wheel (*a*) comes to the edge of the substance, and roll the instrument over the same, when the number of feet and half feet can be read off the wheel (B) through the opening (C), and the remaining inches and parts of inches, of the wheel (*a*). Before measuring again any other substance the wheel (*a*) and wheel (B) must always first be turned around in the manner and into the position above mentioned, so that the divisions marked (*o*) correspond with the pointer (*g*) and the edge of the opening (C.) To prevent this inconvenience a spiral spring (L) (Figs. IV, V and VI) can be placed in the center of the wheel (B) to bring the same always in the required position, before measuring any new substance. A projection (*q*) being in that case attached to the wheel (B) as well as a projection (*f*) on the casing (A) to stop the wheel in its right position. A small lever (*r*) is in that case introduced between the casing and worked on the outside by a small handle or knob (K), and arranged in such a manner as to act upon the lever (*m*) and the catch spring (*x*) so as to throw both out off the teeth on the wheel (B), to allow the spiral spring (L) to turn said wheel (B). I do not confine myself making the circumference of the wheel (*a*) exactly six inches as above mentioned, but the same may be made, one, two, three, four, or six inches according to the size of the instrument.

I do not claim the manner of transmitting the motion from the measuring wheel (a) to the counting wheel (B), but

I claim—

5. The arrangement of the box containing the count wheel (B) in connection with the stock carrying the measuring wheel (a) in such a manner that said box is made to serve as a convenient handle for working the instrument.

LOUIS YOUNG.

Witnesses:
JOHN A. STEMMLER,
HENRY E. ROEDER.